United States Patent [19]

Buckholtz

[11] Patent Number: 4,967,838
[45] Date of Patent: Nov. 6, 1990

[54] OIL WELL AND METHOD USING COMPLETION FLUID

[75] Inventor: Harry E. Buckholtz, Lewiston, N.Y.

[73] Assignee: Occidental Chemical Corporation, Niagara Falls, N.Y.

[21] Appl. No.: 407,007

[22] Filed: Sep. 14, 1989

[51] Int. Cl.⁵ .................. C09K 7/04; E21B 33/13; E21B 41/02; E21B 43/12
[52] U.S. Cl. .................. 166/292; 166/305.1; 166/902; 252/8.51; 252/8.551; 252/8.555
[58] Field of Search .............. 166/276, 278, 291, 292, 166/297, 305.1, 310, 371, 902; 252/8.51, 8.514, 8.551, 8.555; 175/65

[56] References Cited

U.S. PATENT DOCUMENTS

| | | | |
|---|---|---|---|
| 1,873,084 | 8/1932 | Walker | 166/310 X |
| 1,997,256 | 4/1935 | Hall. | |
| 2,711,391 | 6/1955 | Kahler. | |
| 2,777,818 | 1/1957 | Gambill | 166/310 X |
| 2,813,075 | 11/1957 | Brooke | 252/8.555 |
| 2,900,222 | 8/1959 | Kahler. | |
| 3,248,692 | 4/1966 | Metler et al. | 252/8.551 X |
| 3,284,319 | 11/1966 | Hill | 252/8.555 X |
| 3,431,217 | 3/1969 | Hwa. | |
| 4,409,121 | 10/1983 | Latos | 252/8.555 |
| 4,521,316 | 6/1985 | Sikorski | 252/8.551 |

Primary Examiner—George A. Suchfield
Attorney, Agent, or Firm—James F. Tao; Richard D. Fuerle

[57] ABSTRACT

Disclosed is a method of preventing fluids in the ground from rising around an oil well pipe by filling the space around the pipe with an oil well completion fluid comprising water, about 50 to about 65% by weight, based on total fluid weight, of dipotassium phosphate, and at least about 10 ppm hexavalent chromium. The fluid can be prepared by neutralizing wet process phosphoric acid with potassium hydroxide to a pH of less than 12 and filtering off any solids. Also disclosed is an oil well employing the completion fluid.

22 Claims, No Drawings

OIL WELL AND METHOD USING COMPLETION FLUID

BACKGROUND OF INVENTION

This invention relates to an oil well completion fluid. More particularly, it relates to a fluid which comprises water, about 50 to about 65% by weight dipotassium phosphate, and at least about 10 ppm hexavalent chromium.

An oil well completion fluid is a fluid used in oil drilling to counterbalance the pressure of fluids in the earth, and prevent them from rising to the surface at the oil well except under the control of the oil well operator. Such fluids may be placed in between the casing and the piping or at the bottom of the piping. Because oil well completion fluids are in contact with the oil well piping, which is subject to corrosion, as well as in contact with the ground at the bottom of the well, a good oil well completion fluid must have a rather unusual set of properties that enable it to function well in this environment. These properties include a density of at least 12 lbs/gal., and preferably greater than 14 lbs/gal., so that the weight of the fluid keeps the oil and other fluids in the earth from entering the piping or otherwise coming to the surface except under the control of the operator. The completion fluid should be mechanically and chemically stable under the conditions encountered in the well; i.e., there must be no settling of suspended solids and no chemical precipitates if mixed with produced fluids or gases. Thus, it should have a crystal point temperature of less than 3.C as oil well drilling at sea and in some states is performed at low temperatures; a fluid that crystallized might also immobilize the piping and prevent it from being raised and lowered. It should also be stable at high (i.e., greater than 80° C.) temperatures for long periods as some geological formations containing oil are in geothermal areas. Since the piping is generally made from carbon steel, the fluid must be relatively non-corrosive to carbon steel and should have a corrosion rate of less than 5 mils per year; the fluid should also not degrade to form compounds that are corrosive. The presence of organic material in the fluid is undesirable as organic matter can be easily thermally or bacteriologically degraded. The fluid should remain pumpable over the life of the formation and should not thicken or gel over time. An ideal fluid would form no significant solids as a result of exposure to up to 1800 ppm of calcium hardness, carbon dioxide, or hydrogen sulfide. The fluid should contain potassium cations rather than sodium cations because sodium cations tend to swell clay formations which plug the formations and impede the extraction of oil. A pH of less than 12 is desirable to prevent injury to the operators from handling caustic fluids.

SUMMARY OF THE INVENTION

I have discovered that an aqueous composition containing about 50 to about 65% by weight dipotassium phosphate and at least 10 ppm hexavalent chromium meets all, or almost all, of the desirable properties for an oil well completion fluid. While an identical composition which does not contain hexavalent chromium has an unacceptably high corrosion rate, I have discovered that the presence of the hexavalent chromium in the composition reduces the corrosion rate to less than 0.04 mils per year. The fluid of this invention is chemically and mechanically stable and does not decompose or lose its properties with the passage of time even under the extreme temperature conditions encountered in oil wells. It does not hydrolyze or otherwise decompose under extremely long periods at elevated temperatures. It has a high density of 14.1 lbs/gal., a low crystal point temperature of less than 0° C., contains principally the potassium cation, and does not contain any organics. It has a relatively low pH of 9.6 and does not precipitate solids.

DESCRIPTION OF THE INVENTION

The oil well completion fluid of this invention comprises water, at least about 10 ppm hexavalent chromium, and about 50 to about 65% by weight, based on total fluid weight, of dipotassium phosphate (DKP):

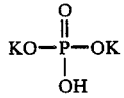

Dipotassium phosphate can be made by adding potassium hydroxide or potassium carbonate to phosphoric acid:

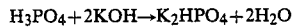

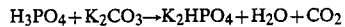

While DKP is preferably the only phosphate in the oil well completion fluid of this invention, it is possible to substitute tetrapotassium pyrophosphate (TKPP) for up to about 15 of the percentage points of the DKP. When it is desirable to increase the density of the fluid, this can be easily accomplished by adding dry TKPP to the fluid since anhydrous TKPP is more readily available than anhydrous DKP. Potassium chloride, which is less expensive than DKP or TKPP, can also be substituted for up to about 10 of the percentage points of the DKP. However, the use of potassium chloride results in a poorer quality fluid because the chloride ion is corrosive and it has only limited solubility in the fluid. If less than 50% DKP is used, the density of the fluid will be too low for most applications as an oil well completion fluid, and more than 65% DKP may result in the precipitation of DKP. Preferably, the oil well completion fluid contains about 60 to about 65% DKP.

The oil well completion fluid can conveniently be prepared from any phosphoric acid solution. For example, thermal (furnace) phosphoric acid, a high quality but expensive phosphoric acid made by burning elemental phosphorus to make phosphorus pentoxide which is scrubbed to make phosphoric acid, can be used. However, in the interest of lowest cost, the preferred phosphoric acid is partially purified wet process phosphoric acid which is obtained by the digestion of calcium phosphate rock with sulfuric acid, and which has not been purified by solvent extraction, double precipitation, or other techniques. (Partial purification presumes, however, that sufficient post precipitation techniques, followed by filtration, has been practiced upon the phosphoric acid prior to converting it to DKP.) "Green" wet process phosphoric acid is preferred as it contains fewer organics, and superphosphoric acid (i.e., green phosphoric acid which has been distilled up to a $P_2O_5$ content of at least 70% by weight and has been post-filtered) is particularly preferred. If "black" wet process phosphoric acid is used, it is necessary to remove the organics first. The oil well completion fluid can be prepared from phosphoric acid by neutralizing the phosphoric acid with an alkaline potassium compound, such as potassium hydroxide, to a pH of greater than 9.0 but less than 12, and preferably to less than 10, followed by filtering off any additional solids that may be present (primarily inorganic compounds containing calcium, magnesium, aluminum, or iron cations).

Any soluble chromate can be used as a source of hexavalent chromium, including potassium or sodium chromate or dichromate; potassium chromate is preferred in order to avoid the presence of sodium ions in the fluid. Chromic anhydride, $CrO_3$, can also be added to the fluid, forming chromic acid, $H_2CrO_4$, which in turn is converted to chromate ion, $CrO_4^=$, in an alkaline environment. If the DKP is obtained from thermal or purified wet process phosphoric acid the fluid should contain about 10 to about 70 ppm of hexavalent chromium. Less than 10 ppm of hexavalent chromium is not effective in inhibiting corrosion and more than 70 ppm is wasteful as it does not add much to the effectiveness of the fluid and it may also present an environmental pollution problem. However, if the DKP is obtained from partially purified wet phosphoric acid the hexavalent chromium concentration should be greater than 60 ppm, and preferably greater than 100 ppm. The fluid is used in and around oil wells in a conventional manner by pumping it into the desired location.

The following examples further illustrate this invention.

EXAMPLE 1

Cold rolled carbon steel coupons were placed in a 60% by weight DKP solution derived from thermal phosphoric acid containing various amounts of hexavalent chromium for seven days at 90° C. The fluid had a density of 14.1 lbs/gal, a pH of 9.6, and a crystal point temperature of less than 0° C. The corrosion rate in mils per year was determined by dividing $3.45 \times 10^6$ times the weight loss by the product of the coupon area, the hours in solution, and the coupon density (7.877 g/cc). The following table gives the results.

| Source of Cr | Hexavalent Chromium (ppm) | | Corrosion Rate Mils/Year |
|---|---|---|---|
| | In Source | In Solution | |
| None | 0 | 0 | 21.9 |
| $CrO_3$ | 100* | 52 | 0.11 |
| | 50* | 26 | 0.04 |
| | 25* | 13 | 0.04 |
| | 10 | 5.2 | 13.12 |
| | 5 | 2.6 | 14.32 |
| $K_2Cr_2O_7$ | 48.6 | 18 | 0.06 |
| | 24.3 | 9 | 0.43 |

*Not totally dissolved.

The above table shows that at less than 10 ppm hexavalent chromium the corrosion rate was unacceptably high but that at greater than 10 ppm the corrosion rate was very low.

EXAMPLE 2

Cold rolled carbon steel coupons were placed in a 60% by weight DKP solution derived from green wet process phosphoric acid at 90° C. for seven days. This solution contained 60 ppm of $Cr^{+3}$, but virtually no hexavalent chromium and showed an unacceptable rate of corrosion. The test was rerun by adding various amounts of $K_2Cr_2O_7$ and the corrosion rates are given in the table below.

| Amount $K_2Cr_2O_7$ | Hexavalent Chromium (ppm) | Corrosion Rate Mils/Year |
|---|---|---|
| 0 | 0 | 48.63 |
| 14.5 | 50 | 5.95 |
| 98 | 100 | 0.167 |
| 196 | 200 | 0.151 |
| 392 | 400 | 0.130 |

The above table shows that when the DKP is obtained from partially purified wet process phosphoric acid, the concentration of hexavalent chromium in the fluid should exceed 50 ppm.

I claim:

1. A method of preventing fluids in the ground from rising around an oil well pipe comprising filling the space around said pipe with an oil well completion fluid which consists essentially of an aqueous solution of about 50 to about 65% by weight, based on total fluid weight, of dipotassium phosphate and at least about 10 ppm hexavalent chromium.

2. A method according to claim 1 wherein the amount of said hexavalent chromium is less than 70 ppm.

3. A method according to claim 1 wherein said hexavalent chromium is added as chromic acid.

4. A method according to claim 1 wherein said hexavalent chromium is added as chromic anhydride.

5. A method according to claim 1 wherein said hexavalent chromium is present as potassium chromate.

6. A method according to claim 1 wherein the amount of said dipotassium phosphate is about 60 to about 65% by weight.

7. A method according to claim 12 wherein said oil well completion fluid is made by neutralizing partially purified wet process phosphoric acid with an alkaline potassium compound and adding sufficient hexavalent chromium to said fluid to bring the concentration of hexavalent chromium in said fluid to at least 60 ppm.

8. A method according to claim 7 wherein said wet process phosphoric acid is neutralized to a pH of less than 10.

9. A method according to claim 7 wherein said wet process phosphoric acid is green wet process phosphoric acid.

10. A method according to claim 9 wherein said green wet process phosphoric acid is superphosphoric acid.

11. A method according to claim 1 wherein said oil well completion fluid consists of an aqueous solution of about 50 to about 65% by weight, based on total fluid weight, dipotassium phosphate and about 10 to about 70 ppm hexavalent chromium.

12. An oil well comprising a steel pipe passing from the surface of the ground into the ground in a generally vertical direction surrounded by an oil well completion fluid which consists essentially of an aqueous solution of about 50 to about 65% by weight, based on total fluid weight, of dipotassium phosphate and at least about 10 ppm hexavalent chromium.

13. An oil well according to claim 12 wherein the amount of said hexavalent chromium is less than 70 ppm.

14. An oil well according to claim 12 wherein said hexavalent chromium is added as chromic acid.

15. An oil well according to claim 12 wherein said hexavalent chromium is added as chromic anhydride.

16. An oil well according to claim 12 wherein said hexavalent chromium is present as potassium chromate.

17. An oil well according to claim 12 wherein the amount of said dipotassium phosphate is about 60 to about 65% by weight.

18. An oil well according to claim 12 wherein said oil well completion fluid is made by neutralizing partially purified wet process phosphoric acid with an alkaline potassium compound and adding sufficient hexavalent chromium to said fluid to bring the concentration of hexavalent chromium in said fluid to at least 60 ppm.

19. An oil well according to claim 18 wherein said wet process phosphoric acid is neutralized to a pH of less than 10.

20. An oil well according to claim 18 wherein said wet process phosphoric acid is green wet process phosphoric acid.

21. An oil well according to claim 20 wherein said green wet process phosphoric acid is superphosphoric acid.

22. An oil well according to claim 12 wherein said oil well completion fluid consists of an aqueous solution of, about 50 to about 65% by weight, based on total fluid weight, dipotassium phosphate and about 10 to about 70 ppm hexavalent chromium.

* * * * *